AUTOMATIC SCANNING DEVICE FOR ANALYZING TEXTURES

Filed June 30, 1966 Sheet 1 of 5

INVENTOR:
JEAN SERRA
BY Kurt Kelman
AGENT

INVENTOR:
JEAN SERRA
BY Kurt Kelman
AGENT

INVENTOR:

JEAN SERRA

BY Kurt Kelman

AGENT

INVENTOR:
JEAN SERRA
BY Kurt Kelman
AGENT

INVENTOR:
JEAN SERRA
BY Kurt Kelman
AGENT

United States Patent Office 3,449,586
Patented June 10, 1969

3,449,586

AUTOMATIC SCANNING DEVICE FOR ANALYZING TEXTURES

Jean Serra, Stations d'Essais-Irsid, Maizieres-les-Metz, Moselle, France

Filed June 30, 1966, Ser. No. 561,932
Claims priority, application France, July 2, 1965, 23,273
Int. Cl. G01n *21/30, 21/00;* G01b *11/28*
U.S. Cl. 250—219 10 Claims

ABSTRACT OF THE DISCLOSURE

An automatic scanning device analyzes the texture of a heterogeneous medium with means which detects a quality in one zone of the medium and converts the detected quality into an electric signal, means for displacing the zone within the medium and for taking uniformly spaced measurements throughout the medium, a memory system wherein each signal is stored, logical selection means for comparing the stored signals, and counting means for integrating separately the number of concordances and discordances of the stored signals.

This invention relates to a device for the automatic statistical analysis of the geometrical distribution of distinct qualities which are distributed in a heterogeneous medium, particularly when it is possible to obtain from this medium an image which distinguishes by means of colors or optical densities which are sufficiently different from each other the different elements or the different qualities of the said heterogeneous medium. This is the case, for example, of the distribution of petrographic elements in ores. The present invention was conceived at the time of a geostatistical study of petrographic regionalizations in iron ores. However, it is also wholly apparent that the invention is not limited to this particular application.

The object of the invention is to render automatic and very rapid certain operations of optical analysis of the images of heterogeneous media and of statistical calculation on the basis of data collected during the said analysis.

To this end, the present invention has for its object a device for analyzing the texture of a heterogeneous medium, characterized in that it comprises in combination: means for detecting a predetermined quality in one zone of the said heterogeneous medium and for representing the said quality by a readily measurable physical quantity and preferably an electric signal; means for displacing the said zone within the medium to be analyzed and for taking uniformly spaced measurements throughout the said medium; means for storing the value of the said physical quantity in a memory system as each measurement is taken; logical selection means for comparing the stored values two by two, three by three, . . . $k$ by $k$; and counting means for integrating separately the number of concordances or discordances of the stored values in the case of measurements which are separated by different distances within the said medium.

In an alternative embodiment, the invention is characterized in that it comprises in combination: means for measuring a predetermined quality in one zone of the heterogeneous medium and for representing the said quality by an electric signal; means for displacing the said zone within the medium to be analyzed and for taking uniformly spaced measurements throughout the said medium, the spacing between two successive measurements constituting the analysis pitch; storage means for retaining the value of the said electric signal at the time of the $n$ last measurements, $n$ being a predetermined whole number, the value supplied by each new measurement replacing progressively the oldest value contained in the said storage means; logical selection means for comparing the stored values $k$ by $k$ after each measurement; and counting means for integrating throughout the course of the analysis the total number of concordances or discordances of the values contained in the storage means and corresponding to an arrangement of $k$ zones which are located with respect to each other at constant multiple distances of the order 1 to $n$ of the analysis pitch.

In a preferred embodiment which is applicable to the analysis of texture of the images of a heterogeneous medium, the invention is more especially characterized by the combination of the following elements: at least one photoelectric receiver having a spectral sensitivity which is adapted to the color which is sought on the image and fitted with a suitable optical device which delivers an electric signal representing one zone of the image; scanning means for displacing the measurement zone over the surface of the image to be analyzed along successive lines; at least one storage shift register corresponding to each photoelectric receiver, each register comprising $n$ binary storage elements; at least one digital counter associated with a logic circuit which determines the concordance or discordance between the signals contained in $k$ storage elements to which it is connected; a selection matrix for connecting the said logic circuit to the selected storage elements; and a control circuit which is synchronized with the image-scanning means so as to produce at regular intervals the displacement by one element of the data contained in each storage register, the input in the last element of each register of the electric signal which is supplied by the corresponding photoelectric receiver and the operation of each digital counter.

The invention can also comprise one of the following features in combination with the preceding:

(a) The optical device is a microscope fitted with a photometer which contains the photoelectric receiver;

(b) The number of photoelectric receivers fitted with suitable fitlers corresponds to the number of colors whose presence in the image is to be detected;

(c) The scanning means consist of an automatic moving stage which performs beneath the object-lens two orthogonal movements which are programmed in such a manner that the zone under observation moves over the image along successive lines;

(d) The movement of the moving stage is performed at a constant speed and the storage and counting operations are started at the beginning of each analysis line and discontinued at the end of each line;

(e) The control circuit emits periodic pulses having a frequency which defines the analysis pitch in relation to the speed of displacement of the stage, each pulse being intended to initiate the opening of "gates" disposed between the photoelectric receivers and the storage registers on the one hand and between the logic circuits and the counters on the other hand and then the counting operation;

(f) An additional digital counter records the total number of measurement points analyzed on the image;

(g) Changover switches to connect the logic circuits to the corresponding counters in spite of the change in direction of displacement of the moving stage.

In the foregoing and in the following description, the word "zone" designates a small portion of the image which is limited by a geometrical contour which can be reduced to a segment or a point.

The present invention is intended for the automatic and rapid statistical study of regionalizations such as natural accumulations of material (geological formation) or certain artificially produced agglomerates, particularly when the said regionalizations appear on images of the medium with contrasting colors or densities.

The invention is particularly suitable for petrographic studies by means of recent methods of mathematical analysis which are based on the theory of random functions as well as an harmonic analysis. These methods which are explained at length in the book by G. Matheron entitled: "Traité de Géostatique Appliquée" (vols. 1 and 2 essentially utilize the moments of the second order in the case of production of random functions having stationary increments which are known as intrinsic regionalizations or their equivalents which are also defined by G. Matheron in the case of nonintrinsic regionalizations. When these random functions are of the "all or none" type, that is to say when each point of the space in which they are produced is capable of assuming only one of two fixed values such as 0 or 1, one can very readily define and employ moments having an order greater than 2 and even an infinite order. Consideration will now be given to a zone $z$ which is centered at a point $x$ ($x$ representing the extremeity of a vector); it will be stated that:

$f_z(x)=0$ if no point of $z$ assumes the value 1
$f_z(x)=1$ if at least one point of $z$ assumes the value 1 and similarly;
$f_{-z}(x)=0$ if at least one point of $z$ assumes the value 0
$f_{-z}(x)=1$ if all the points of $z$ assumes the value 1.

These transformations introduce through a geometric expedient the moments of infinite order which are associated with all the points of the zone $z$ of the random function in the corresponding "all or none" state, which can be verified mathematically.

More concretely, it can be stated that all the images having sufficiently contrasting colors, or the geometrical shapes, in petrography, are random functions in the "all or none" state; for example, at each point, quartz may be present or else there may be none.

However, the invention is not limited to petrographic studies and could equally well be applied to the study of other heterogeneous media of granular type and the like, whether natural or artificial. There can be mentioned by way of example outcrops, migrations of elements, porous media, inclusions in metals, crystallogenesis, and many others which are capable of varying with time, as in biology the evolution of bacterial populations or of a cell culture.

The invention can be applied to a large number of practical uses of considerable importance. For example, it is possible by means of the invention to measure specific surface areas (surface area of a body which is in contact with the external medium per unit volume) and, more generally, the contact surface area of paired constituents in a heterogeneous assembly comprising a plurality of constituents. By taking measurements in three dimensions of the heterogeneous medium being studied, it can be visualized that the measurements thus determined represent the said surface areas in three-dimensional space and not only their cross-section or projection in one plane. It is particularly useful to know these specific surface each time a physical or chemical action on a body is related to the contact surfaces which are present. Such measurements have made it possible, for example, to determine the coefficients of convection in heat transfer processes and the coefficients of flotation of crushed ores.

It is also possible to determine both in position and in magnitude the parameters which describe the textures in which one constituent surrounds another to a more or less complete extent, the phenomena observed being either of the "film" type or simply of the "juxtaposition" type. These phenomena have been given particularly close study by the present Applicant by means of the method in accordance with the invention for the purpose of measuring the growth of certain substances which develop at the expense of others, in the field of reduction of iron oxides.

It is also possible to measure particle size distributions, whether directional or otherwise, by employing as scanning zone segments of straight lines, circles or rectangles. This type of measurement has been mainly employed up to the present time in studies of pore structures in porous bodies (agglomerates of iron ores) or of unbroken ore in situ according to metric scales (according to photographic reductions). However, in this case as in the case of the two preceding types of parameters, these are applications which are valid for any other texture.

The two first types of applications which have been mentioned above are carried out by means of a scanning zone which is defined by a group of two points located at distance $\bar{h}$ from each other and having a barycentre $x$. The function which is associated with the "all or none" transformation is then known as a "covariogramme" if it is required that both points should be located in the same constitiuent and as a "right-angled or rectangle covariogramme" if it is required that each of the two points should be located in a different constituent. The latter type of measurement is carried out by means of a product of all-or-none transformation of linear zones, circular zones or rectangular zones.

The preceding examples relate to petrography. The function $F_{11}(h)$ which in turn is known as an intrinsic covariogramme can advantageously be employed in metallographic applications such as, for example, for the analysis of non-metallic inclusions of a burnished steel section. The apparatus operates in this case in exactly the same manner as has just been described and serves to determine quantitatively the percentage content of inclusions which is the zero point or origin of the covariogramme, the specific surface area of the inclusions which is proportion to the tangent to the origin of the covariogramme, the arrangements of inclusions either in isolated locations or more or less group together which appears in the form of extremums of the covariogramme at different distances $h$ and finally the shape of the inclusions which is represented by the anisotropy of the covariogramme in different directions.

In a preferred mode of execution, the invention makes use of a conventional microscope of the type employed up to the present time in petrographic laboratories for the analysis of geometric regionalizations represented by contrasting grey or colored images, either microscopic (thin lamellae, for example) or macroscopic, but capable of being reduced to a small format (24 x 36 millimeters, for example) by photography. The microscope is accordingly equipped with an object-supporting stage with automatic motion and a photometer comprising one photoelectric cell per color, the presence or absence of which it is desired to detect in the point under analysis of the image, each photoelectric cell being evidently fitted with a selective filter which makes it sensitive only to the color which is sought. The same equipment is employed in the same manner for the study of "grains" and "pores" in a porous medium (the "pores" being constituted by the intergranular space) by filling the pores by impregnation with a colored or fluorescent resin which is illuminated by an ultraviolet light.

A better understanding both of the invention and of its mode of operation as well as the advantages arising therefrom will be gained by consideration of the following description of one example of the device for analyzing the texture of geological samples, said example being given without any limitaton being implied. Reference is made in the description to the accompanying drawings, in which.

Figure 1:
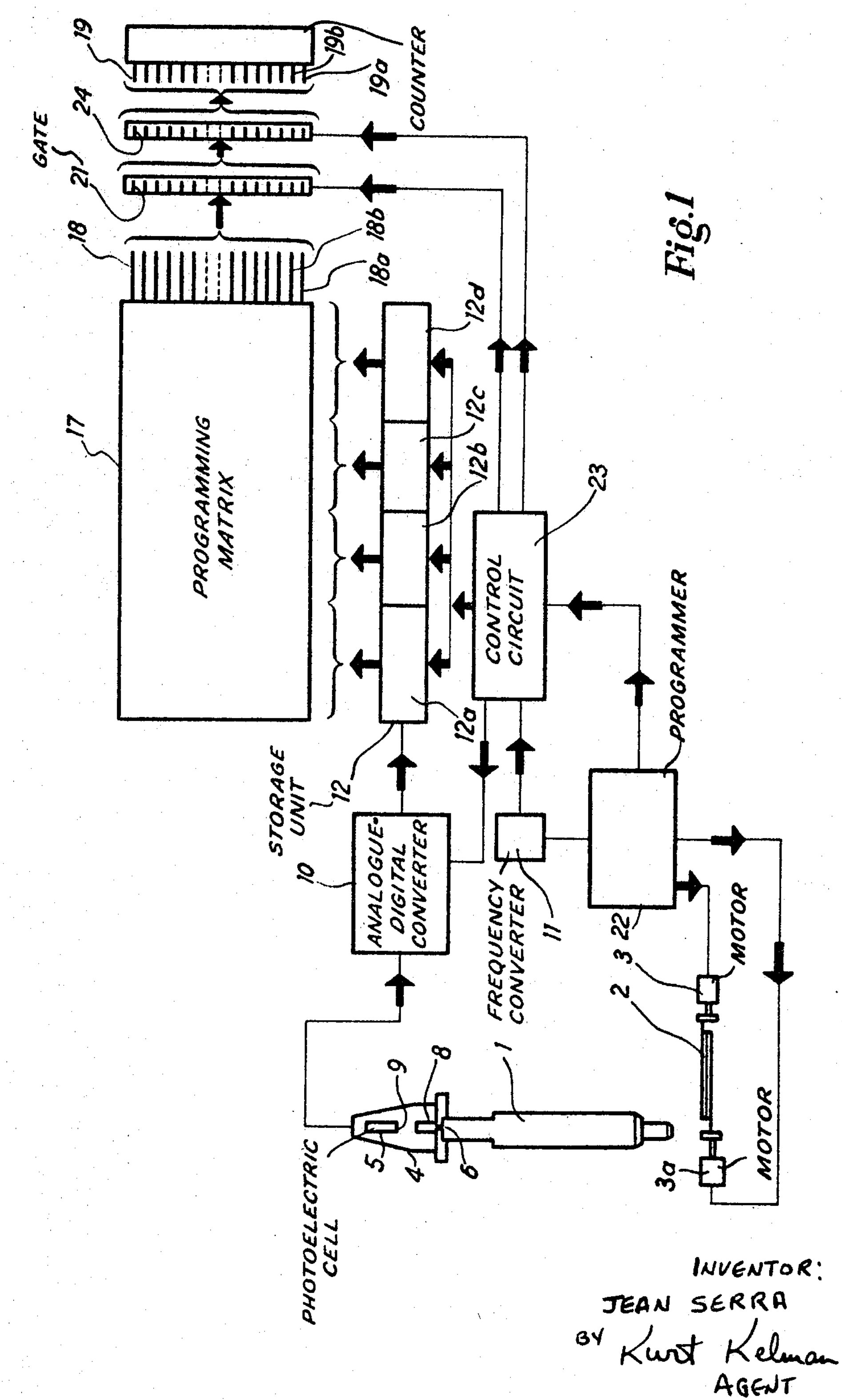
FIG. 1 is a simplified diagram of the device as a whole.
Figure 4:
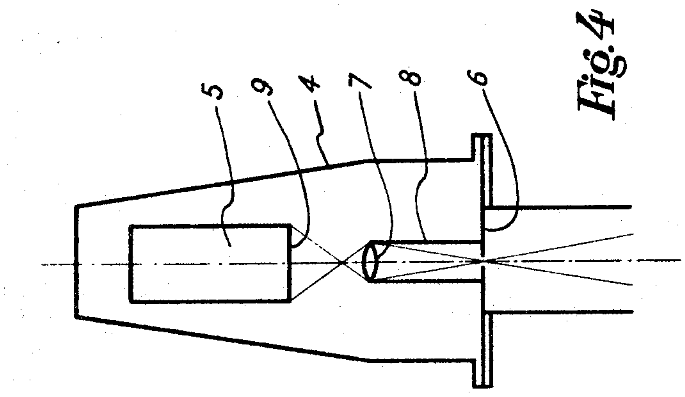
FIG. 4 is a more detailed diagram showing the mode of arrangement of the photoelectric cell.

There is shown in FIG. 1 a highly simplified diagram of the complete device in accordance with the invention. The samples which are subjected to analysis are placed beneath the object-lens of a microscope 1 and supported by a stage 2 of the automatic displacement type which is adapted to perform two orthogonal movements by means of two motors 3 and 3*a*, the operation of which will be explained below. The microscope 1 is surmounted by a light-proof box 4 in which is mounted a photoelectrc cell 5 of the electron multiplier type. A diaphragm 6 which can be seen more readily in FIG. 4 is located in the plane of the real image which is supplied by the microscope 1 (the light-sensitive emulsion employed for micro-photography being usually placed in this plane). A convergent lens 7 which is supported by a lens-carrier tube 8 is placed above the diaphragm 6 at a distance such that it transforms the ray beam derived from the diaphragm into a beam which exactly covers the sensitive surface of a photocathode 9.

The photomultiplier 5 which is supplied with current at high voltage in a known manner (and which is not shown in the drawings) delivers a signal which represents the optical density of the sample zone which is viewed through the microscope and transmitted to the photocathode 9. The shape and dimensions of this zone are defined by the magnification of the microscope and the shape and dimensions of the opening of the diaphragm 6. This zone can be, for example, a circle, a segment of a straight line and the like, and can be reduced practically to a point.

The signal which is delivered by the photoelectric cell is applied to an analogic-digital converter 10 with thresholds and comprising bistable units of the "Schmitt trigger" type which compare the signal with pre-set threshold voltages. Each trigger circuit delivers a digital signal which can assume two fixed values depending on whether the signal from the photoelectric cell is lower than or else either higher than or equal to the corresponding threshold. The circuit 10 is provided with a suitable switching system which makes its possible to introduce either one, two or three thresholds at the same time and to adjust the levels of the said thresholds.

Figure 2:
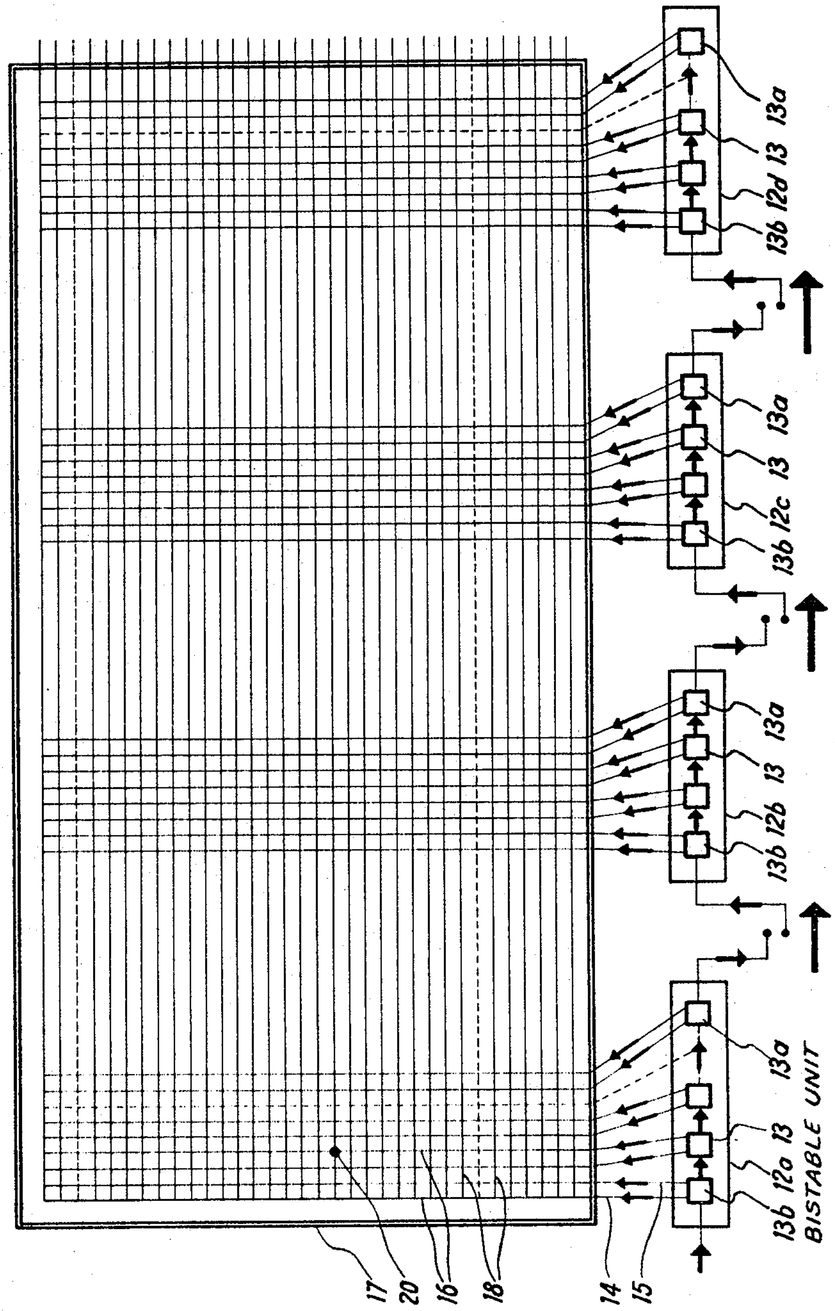
FIG. 2 is a more detailed diagram of the storage registers and of the programming matrix.

A frequency converter 11 driven by the frequency of the mains supply (50 Hertz), the transformation ratio of which is ⅔, emits pulses at a repetition rate of $\frac{2}{3}\times 50=33$ per second, so that the digital signals derived from the circuit 10 are tested 33 times per second during a very short time interval of the order of $10^{-6}$ second. Their instantaneous value is directed to a storage register unit 12 comprising in this example four registers 12*a*, 12*b*, 12*c* and 12*d* which will be seen in greater detail in FIG. 2. Each register is composed of cascade-connected binary bistable units 13. The register 12*a* comprises nine bistable units, the registers 12*b* and 12*c* each comprise four bistable units and the register 12*d* comprises eight bistable units.

The circuit 10 has at the same time another function which can be utilized, namely, a bistable system which is capable of changing from one state to another only once which makes it possible to test whether, during the interval which elapses between two consecutive sampling tests on the digital signal, the said digital signal has remained continuously in the same state.

When this second function is employed, the unit 12 must necessarily be divided into two sections 12*a* and 12*d* for example, or alternatively 12*a* and 12*b* on the one hand and 12*c* and 12*d* on the other hand; the first section will be employed for point samplings whilst the second section receives different data of digital type depending on whether, during the interval considered, a change of state has taken place or not.

Each bistable unit 13 has two complementary outputs 14 and 15 such that, if one of the outputs is in the zero state when the other is in state one, and wherein the zero state of the output 14 corresponds to a voltage below the preset threshold of the photomultiplier 5 whereas state one of the same output 14 indicates a voltage which is higher than or equal to said preset threshold, the zero state can correspond to a black zone of the image and state one to a white zone. In the case of the output 15, the signs are reversed or, in other words, the zero state of this output corresponds to a voltage which is higher than or equal to the preset threshold whereas state one corresponds to a voltage which is lower than said threshold.

Since there are in all 25 bistable units in the register 12, there are obtained 50 outputs which are each connected to a column 16 of a programming matrix 17; the matrix 17 additionally comprises 50 lines 18 which are each connected to a counter 19. The columns 16 and the lines 18 are perpendicular to each other in the case of the figure and are located in two parallel horizontal planes, with the result that they are not in contact with each other. In order to connect a line 18 to a column 16, use is made of a contact 20 or so-called "jack" which moves down in vertically opposite relation to the intersection of the column and line considered. The jack 20 serves to put a line 18 and a column 16 at the same potential. It is readily apparent that a same line can be occupied by a number of jacks 20. Each line 18 is connected to the corresponding counter 19 by means of a gate 21 which trips only during a time interval of the order of $10^{-2}$ second.

It has already been seen that the device comprised a frequency converter 11 which operates on the mains supply and produces 33 cycles per second; the said converter additionally comprises a programmer 22 which controls the displacement of the stage 2 and which is connected to the converter 11. The programmer 22 and the converter 11 are also coupled with the gates 21, the unit 11 and the circuit 10 by way of a control circuit 23 which gives successively the three following orders:

(1) Order to the registers 12*a*, 12*b*, 12*c* and 12*d* to transmit the information stored in each bistable unit to the following bistable unit and consequently to destroy the information contained in the last bistable unit 13*a* on the right hand side of each register.

(2) Order to feed new data derived from the circuit 10 at the rate of one per register and to place the said data in the first left-hand bistable unit 13*b* of each register.

(3) Order to open the gates 21 in order to cause a counter 19 to progress by one unit if necessary, that is to say if the corresponding line 18 is energized. Depending on the direction of displacement of the stage 2, changeover switches such as 24 which are connected to the control circuit 23 cause either two counters 19*a* and 19*b* or on the contrary two counters 19*b* and 19*a* to correspond to the different pairs of lines such as the lines 18*a* and 18*b*. In the case of FIG. 1, the lines 18*a* and 18*b* correspond to the counters 19*a* and 19*b*.

The three orders which are given by the control circuit 23 are delivered 33 times per second, this time base being regulated by the frequency converter 11.

Figure 3:
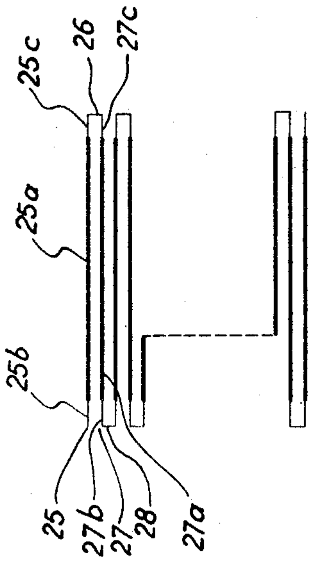
FIG. 3 illustrates the movement of displacement which is performed by the sample-carrying stage.

FIG. 3 illustrates one example of displacement effected by the sample-carrying stage 2 as well as the operation of this latter.

The stage 2 is adapted to move in two orthogonal directions by virtue of the two motors 3 and 3*a*, each direction being two-way. FIG. 3 shows in particular a cycle of displacement which comprises the lines 25, 26, 27 and 28. The line 25 represents the path which is followed by the stage 2 under the action of the motor 3, for example, the motor 3*a* being stopped; the line 26 represents the path which is followed by the stage 2 under the action of the motor 3*a*, the motor 3 being stationary; the line 27 represents the path which is followed by the stage 2 under the action of the motor 3, the direction of rotation of which has been reversed and the motor 3*a* being stationary; the line 28 represents the path followed under the action of the motor 3*a* which always rotates in the same direction, whereas the motor 3 is stopped. The second cycle is then undertaken, followed by a third, and so forth in sequence.

In the case of a given cycle, the counters 18 are connected only into the thick portions of the lines 25 and 27 as respectively designated by the references 25$a$ and 27$a$; since the path 27$a$ is followed in the direction opposite to the path 25$a$, the counters 18 are reversed by means of the changeover switch 24. During the displacements which are shown in thin lines as designated by the references 25$b$, 25$c$, 26, 27$b$ and 28, the gates 21 of the counters are closed.

It will be readily understood that the displacement which is shown in FIG. 3 is not given in any limiting sense and that a pattern comprising any straight lines could be followed such as, for example, a Greek key pattern; similarly, it would be possible to record states in displacements in two different directions for a same cycle.

Figure 5:
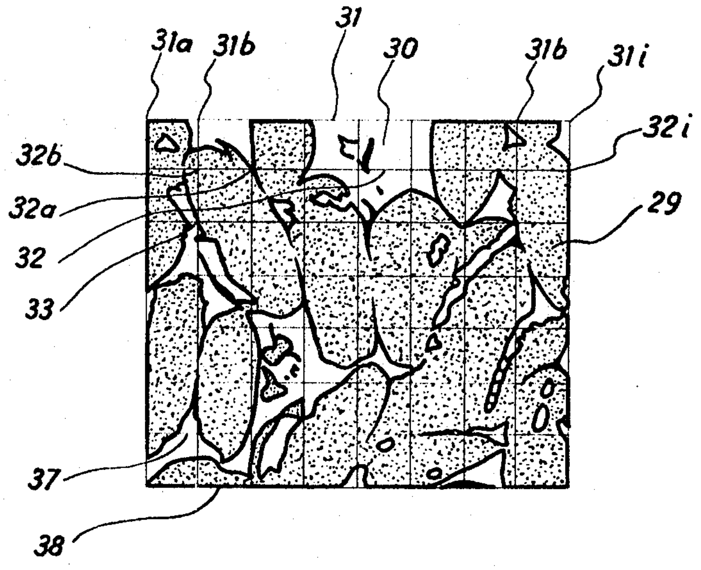
FIG. 5 is a portion of a sample which has been subjected to geostatistical analysis.

FIG. 5 is a portion of a sample which has been subjected to geostatistic analysis.

The sample consists of a thin lamina of oolitic iron ore originating from La Mourière (Lorraine basin). The dark areas 29 consist of oolites which can be distinguished by their shape whilst the white areas 30 consist of chlorites. The thin lamina which is mounted on the stage 2 is displaced at the same time as this latter; during this movement of displacement, the photomultiplier 5 will receive the image of the points 31$a$, 31$b$, . . . 31$h$, 31$i$ which are disposed on line 31. Similarly, the photomultiplier will receive the image of the points 32$a$, 32$b$, . . . 32$h$, 32$i$ which are disposed on a line 32 and so forth.

All those points whose brightness is greater than or equal to that which is defined by the threshold are referred-to as zero; all the other points are designated as one.

The signals which are delivered by the photomultiplier 5 and transformed by the digital analogue circuit 10 which operates in the case of the example solely in discontinuous operation enter into the storage unit 12 in the following order:

Line 31 ________________________ 1 0 1 1 0 0 1 1 0
Line 32 ________________________ 1 1 1 1 0 0 1 1 1
. . . . . .
Line 38 ________________________ 1 1 1 1 0 1 1 1 1

On line 31, the succession of nine numerals will make the following contribution: in the case of the counter 18 which stores the number of consecutive pairs 00, the line 31 makes a contribution of one unit since it has only one pair of two consecutive zeros; in the case of the counter which stores the number of consecutive pairs 11, the line 31 makes a contribution of two units. In the present case, it can be seen that $k=2$ since these are pairs of points.

In the case of the counter 19 which stores the number of pairs 0 which immediately precede a 1, the line 31 will make a contribution of two units and so on in sequence for any arrangement of $k$ bistable units.

After scanning of the line 31, the stage 2 continues its travel by virtue of the two motors and thus begins to scan the line 32 in the opposite direction by virtue of the first motor, the direction of rotation of which has been reversed.

At the end of the scanning operation, the number of pairs of points of each of the types is noted on the counters 19 and this number is related to the total number of measured pairs so as to be expressed in terms of frequencies: let $f_{00}(h)$ be the frequency of the pairs 00, let $f_{01}(h)$ be the frequency of the pairs 01, let $f_{10}(h)$ be the frequency of the pairs 10 and let $f_{11}$ be the frequency of the pairs 11 for each distance $h$ which is equal to a multiple of the analysis pitch (distance between two consecutive points), the said multiple having been programmed by means of all the jacks 20 which are located in the matrix 17.

The function $f(h)$ can be measured for the same sample in a number of different directions.

Let us consider the numerical results in the example of FIG. 5. It is observed that, irrespective of the direction, the functions $f(h)$ retain the same numerical value and that $f_{10}(h)=f_{01}(h)$ irrespective of the value of $(h)$.

Hence the first result: the regionalization is isotropic and is not progressively enriched in oolites in any direction.

Figure 6:
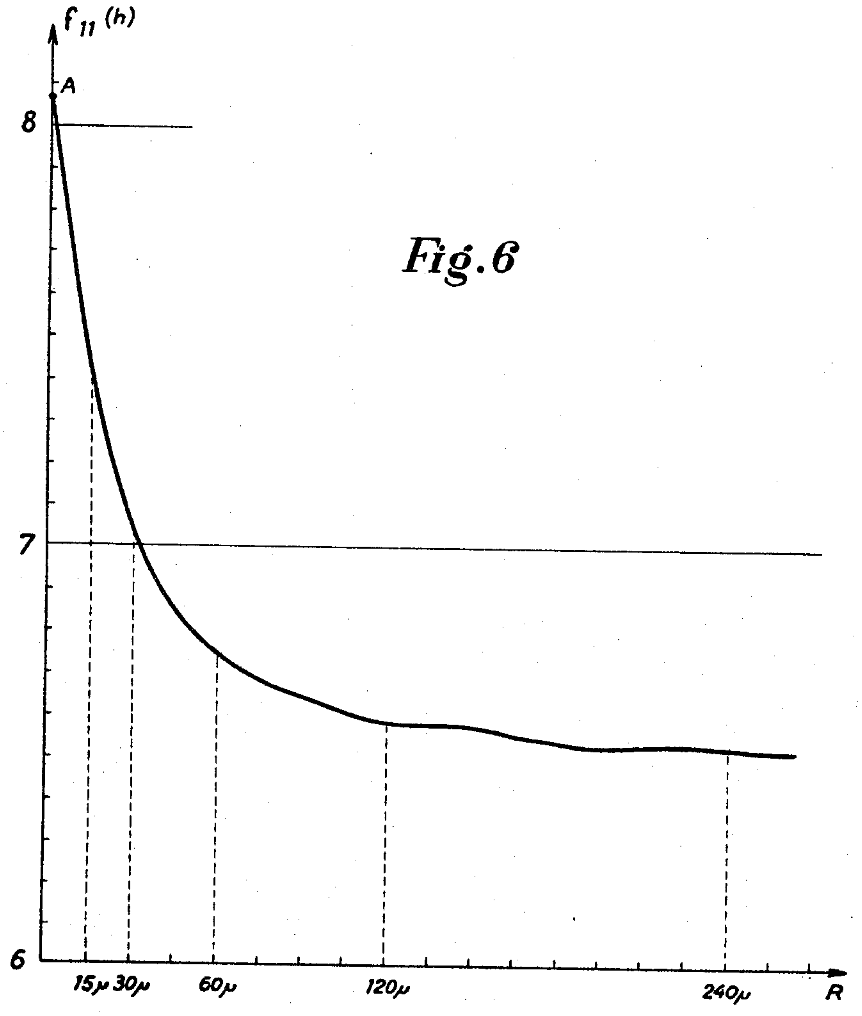
FIG. 6 is a curve which is obtained in respect of the sample of the preceding figure.

We shall now give by way of illustration the numerical values of $f_{11}(h)$ and the corresponding graph (as shown in FIG. 6):

| h ( ) | f (h) | h ( ) | f (h) |
|---|---|---|---|
| h= 0 | 0.8065 | h=12 | 0.6535 |
| h= 1 | 0.7381 | h=13 | 0.6518 |
| h= 2 | 0.7063 | h=14 | 0.6523 |
| h= 3 | 0.6861 | h=15 | 0.6524 |
| h= 4 | 0.6751 | h=16 | 0.6527 |
| h= 5 | 0.6681 | h=17 | 0.6522 |
| h= 6 | 0.6646 | h=18 | 0.6514 |
| h= 7 | 0.6603 | h=19 | 0.6504 |
| h= 8 | 0.6581 | h=20 | 0.6510 |
| h= 9 | 0.6579 | h=21 | 0.6508 |
| h=10 | 0.6578 | h=22 | 0.6563 |
| h=11 | 0.6550 | h=23 | 0.6520 |

The total number of pairs measured is 20,000 and the pitch is $15\mu$.

This curve $f_{11}(h)$ supplies a number of results. The following, among others, may be mentioned:

(1) The proportion of oolites is $f_{11}(0)=0.8065$ (point A of FIG. 6).

(2) The accuracy with which this proportion is known.

This accuracy depends on the total number of pairs measured and on the shape of the curve $f_{11}(h)$ to which is given a mathematical model (in this case exponential). Taking into account these two data, the accuracy of the numerical value of the proportion of oolites is calculated by means of formulae of so-called "variance of extension and estimation" as set forth in the treatises on geostatistics by G. Matheron mentioned earlier. There is found in this instance as variance of estimation: $\sigma^2=1.8\cdot 10^{-6}$. If allowance is made for the conventional difference of more or less twice the value of the standard deviation, this difference has the value in this instance of 0.5 percent.

(3) The contact surface area of chlorite oolite per unit volume of the ore has the value $-4f_{11}(0)$. If the fraction $f_{11}(h)$ were not isotropic and varied in the direction $\alpha$ of the vector $h$, the said fraction would have the value:

$$\sigma=-\frac{1}{\pi}\int_{\alpha} f^{0}_{11\alpha}(0)\,d\alpha$$

the summation being extended to all directions in space. This specific surface area would in this instance have the value of 0.022 micron$^2$ per micron$^3$.

(4) The maximum size of the oolites, or more precisely, of the passages of straight-line segments through the oolites, is indicated by the abscissa of the horizontal plateau, and has the value in this case of $150\mu$.

Should it be desired to know not only the maximum size but also the particle size distribution of the passage, recourse must be had to the second function of the circuit 10 which is described in lines 22 of page 11 to line 6 of page 12. Again in connection with the same example, the application of this function results numerically in this instance:

| | Percent |
|---|---|
| Section 0–15$\mu$ | 24.4 |
| Section 15–30$\mu$ | 51.4 |
| Section 30–45$\mu$ | 13.1 |
| Section 45–60$\mu$ | 7.7 |
| Section 60–75$\mu$ | 2 |
| Section 75–90$\mu$ | 1 |
| Section 90–105$\mu$ | 0.3 |
| Section 105–120$\mu$ | 0.1 |

The example which has just been set forth has been chosen so as to afford maximum simplicity for reasons of ease of presentation. In practice, there are always more than two constituents and the apparatus accordingly makes it possible to measure at the same time particle sizes, a number of specific contact surface areas and a number of percentages and variances. Finally, many other textural factors arising from arrangements of the grains both with each other and with their cements occur in functions of type $f(h)$ in the form of oscillations or extremums, the study of which is instructive.

As will be readily apparent, the example which has just been described is not given in any sense by way of limitation and a large number of alternative forms or detail modifications could be devised without thereby departing either from the scope or the spirit of the invention.

What is claimed is:

1. A device for analyzing the texture of a heterogeneous medium, characterized in that it comprises in combination means for detecting a predetermined quality in one zone of the said heterogeneous medium and for representing the said quality by a readily measurable physical quantity and preferably an electric signal, means for displacing the said zone within the medium to be analyzed and for taking uniformly spaced measurements throughout the said medium, means for storing the value of the said physical quantity in a memory system as each measurement is taken, logical selection means for comparing the stored values $k$ by $k$, and counting means for integrating separately the number of concordances or discordances of the stored values in the case of measurements which are separated by different distances within the said medium.

2. A device in accordance with claim 1, characterized in that it comprises means for measuring a predetermined quality in one zone of the heterogeneous medium and for representing the said quality by an electric signal, means for displacing the said zone within the medium to be analyzed and for taking uniformly spaced measurements throughout the said medium, the spacing between two successive measurements constituting the analysis pitch, storage means for retaining the value of the said electric signal at the time of the $n$ last measurements, $n$ being a predetermined whole number, the value supplied by each new measurement replacing progressively the oldest value contained in the said storage means, logical selection means for comparing the stored values $k$ by $k$ after each measurement, and counting means for integrating throughout the course of the analysis the total number of concordances or discordances of the values contained in the storage means and corresponding to an arrangement of $k$ zones which are located with respect to each other at constant multiple distances of the order of 1 to $n$ of the analysis pitch.

3. A device in accordance with claim 1, as applicable to the analysis of the texture of images of a heterogeneous medium, characterized in that it comprises at least one photoelectric receiver having a spectral sensitivity which is adapted to the color which is sought on the image and fitted with a suitable optical device which delivers an electric signal representing one zone of the image, scanning means for displacing the measurement zone over the surface of the image to be analyzed along successive lines, at least one storage shift register corresponding to each photoelectric receiver, each register comprising $n$ binary storage elements, at least one digital counter associated with a logic circuit which determines the concordance or discordance between the signals contained in $k$ storage elements to which it is connected, a selection matrix for connecting the said logic circuit to the selected storage elements, and a control circuit which is synchronized with the image-scanning means so as to produce at regular intervals the displacement by one element of the data contained in each storage register, the input in the last element of each register of the electric signal which is supplied by the corresponding photoelectric receiver and the operation of each digital counter.

4. A device in accordance with claim 3, characterized in that the optical device is a microscope fitted with a photometer which contains the photoelectric receiver.

5. A device in accordance with claim 3, characterized in that the number of photoelectric receivers fitted with suitable filters corresponds to the number of colors whose presence in the image is to be detected.

6. A device in accordance with claim 3, characterized in that the scanning means consist of an automatic moving stage which performs beneath the object-lens two orthogonal movements which are programmed in such a manner that the zone under observation moves over the image along successive lines.

7. A device in accordance with claim 6, characterized in that the movement of the moving stage is performed at a constant speed and the storage and counting operations are started at the beginning of each analysis line and discontinued at the end of each line.

8. A device in accordance with claim 3, characterized in that the control circuit emits periodic pulses having a frequency which defines the analysis pitch in relation to the speed of displacement of the stage, each pulse being intended to initiate the opening of "gates" disposed between the photoelectric receivers and the storage registers on the one hand and between the logic circuits and the counters on the other hand and then the counting operation.

9. A device in accordance with claim 3, characterized in that an additional digital counter records the total number of measurement points analyzed on the image.

10. A device in accordance with claim 3, characterized in that changeover switches connect the logic circuits to the corresponding counters in spite of the change in direction of displacement of the moving stage.

References Cited

UNITED STATES PATENTS 3,345,908 10/1967 Jensen.

FOREIGN PATENTS 1,178,234 9/1964 Germany.

OTHER REFERENCES

Jensen et al.: IBM Technical Disclosure Bulletin, vol. 6, No. 8, January 1964, pp. 61–62.

Dym et al.: IBM Technical Disclosure Bulletin, vol. 8, No. 1, June 1965, pp. 121–122.

RALPH G. NILSON, *Primary Examiner.*

M. A. LEAVITT, *Assistant Examiner.*

U.S. Cl. X.R.

356—158, 201, 209